United States Patent
Almog et al.

(10) Patent No.: US 8,381,040 B2
(45) Date of Patent: Feb. 19, 2013

(54) RELOCATABLE INTERRUPT HANDLER FOR TEST GENERATION AND EXECUTION

(75) Inventors: Eli Almog, Haifa (IL); Timothy J. Slegel, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 12/605,786

(22) Filed: Oct. 26, 2009

(65) Prior Publication Data

US 2011/0099431 A1   Apr. 28, 2011

(51) Int. Cl.
*G06F 11/24* (2006.01)
(52) U.S. Cl. .............. 714/45; 714/27; 714/34; 714/703; 712/226; 712/227; 712/244
(58) Field of Classification Search .................... 714/34, 714/703, 45; 712/226, 227, 244
See application file for complete search history.

(56) References Cited

U.S. PATENT DOCUMENTS

| | | | |
|---|---|---|---|
| 4,080,648 A | | 3/1978 | Asano et al. |
| 5,113,521 A | * | 5/1992 | McKeen et al. ................. 714/15 |
| 5,386,565 A | * | 1/1995 | Tanaka et al. ................. 717/128 |
| 5,590,294 A | | 12/1996 | Mirapuri et al. |
| 5,592,674 A | * | 1/1997 | Gluska et al. ................. 710/269 |
| 5,729,554 A | * | 3/1998 | Weir et al. ..................... 714/739 |
| 5,787,241 A | | 7/1998 | Henry et al. |
| 5,956,478 A | * | 9/1999 | Huggins ......................... 714/33 |
| 2002/0116694 A1 | * | 8/2002 | Fournier et al. .................... 716/5 |
| 2002/0184614 A1 | * | 12/2002 | Davia et al. .................... 717/127 |
| 2005/0149711 A1 | * | 7/2005 | Zimmer et al. ................ 712/244 |
| 2006/0218513 A1 | * | 9/2006 | Dozorets et al. ................... 716/5 |
| 2007/0078891 A1 | * | 4/2007 | Lescouet et al. ........... 707/104.1 |
| 2007/0233765 A1 | * | 10/2007 | Gupta et al. .................. 708/446 |
| 2007/0234121 A1 | * | 10/2007 | He et al. .......................... 714/33 |
| 2008/0052574 A1 | * | 2/2008 | Smith et al. ................... 714/724 |
| 2009/0070546 A1 | * | 3/2009 | Choudhury et al. .......... 711/207 |
| 2009/0070570 A1 | * | 3/2009 | Choudhury et al. .......... 712/244 |
| 2009/0282307 A1 | * | 11/2009 | Chaturvedula et al. ....... 714/738 |
| 2009/0307468 A1 | * | 12/2009 | Choudhury et al. .......... 712/227 |

* cited by examiner

*Primary Examiner* — Chae Ko
(74) *Attorney, Agent, or Firm* — Cantor Colburn LLP; John Campbell

(57) ABSTRACT

A relocatable interrupt handler for use in test generation and execution. A method for executing test code includes executing a test code block that includes a plurality of test instructions. The executing includes, for one or more of the test instructions: executing the test instruction; determining that the executing the test instruction caused an exception condition to occur; executing first exception handling logic associated with the exception condition based on determining that the executing the test instruction caused the exception condition to occur, the first exception handling logic located at an entry address consisting of a first memory address value, the executing the first exception handling logic including: clearing the exception condition; and changing the entry address to a second memory address value that is an address of a second exception handling logic. A return code that indicates a result of executing the test code block is then generated.

23 Claims, 6 Drawing Sheets

RELOCATABLE INTERRUPT HANDLER FOR TEST GENERATION AND EXECUTION

BACKGROUND

This invention relates generally to processing within a computing environment, and more particularly to a relocatable interrupt handler for test generation and execution.

Testing interrupts is an important part of processor verification. One method of processor verification includes using a test generator to create appropriate tests for the system and to trigger interrupts. An interrupt, when triggered, is designed to stop system processing, and therefore, a test generator generally has an interrupt handler for processing the interrupts. The main purpose of the interrupt handler is to return processing back to the instruction stream after the interrupt is detected. In some instances, the test generator may also need to fix the conditions that caused the interrupt. When creating long running tests, successful generation of many interrupts, followed by correcting of any faults, is often required. As the number of interrupt decisions that the interrupt handler has to perform increases, the amount of code in the interrupt handler assembly routine also increases.

BRIEF SUMMARY

An exemplary embodiment is a computer program product for executing test code with relocatable interrupt handler instructions. The computer program product includes a tangible storage medium readable by a processing circuit and storing instructions for execution by the processing circuit for performing a method. The method includes executing a test code block that includes a plurality of test instructions. The executing includes, for one or more of the test instructions: executing the test instruction at a first memory location; determining if the executing the test instruction caused an exception condition to occur; executing exception handling logic associated with the exception condition in response to determining that the executing the test instruction caused the exception condition to occur, the exception handling logic executed at a second memory location that is different than the first memory location; and clearing the exception condition and generating a return code that indicates a result of executing the test code block is then generated.

Another exemplary embodiment is a computer implemented method for executing test code with relocatable interrupt handler instructions. The method includes executing on a computer a test code block comprising a plurality of test instructions. The executing includes, for one or more of the test instructions: executing the test instruction at a first memory location; determining that the executing the test instruction caused an exception condition to occur; executing exception handling logic associated with the exception condition in response to determining that the executing the test instruction caused the exception condition to occur, the exception handling logic executed at a second memory location that is different than the first memory location; and clearing the exception condition and generating a return code on the computer that indicates a result of executing the test code block is then generated in the computer.

A further exemplary embodiment is a computer program product for implementing relocatable interrupt handlers in a computer system. The computer program product includes a tangible storage medium readable by a processing circuit and storing instructions for execution by the processing circuit for performing a method. The method includes generating a test code block. The generating includes generating a plurality of test instructions. The generating also includes performing for one or more of the test instructions: determining that one or more exception conditions are associated with the test instruction; identifying one or more exception handling code segments associated with the one or more exception conditions in response to determining that the one or more exceptions are associated with the test instruction, each exception handling code segment corresponding to one exception condition; and inserting the one or more exception handling code segments into the test code block in response to identifying the one or more exception handling code segments. In addition, the test code block is stored.

Yet another exemplary embodiment is a computer implemented method for implementing relocatable interrupt handlers in a computer system. The method includes generating on a computer, a test code block. The generating includes generating a plurality of test instructions. The generating also includes performing for one or more of the test instructions: determining that one or more exception conditions are associated with the test instruction; identifying one or more exception handling code segments associated with the one or more exception conditions in response to determining that the one or more exceptions are associated with the test instruction, each exception handling code segment corresponding to one exception condition; and inserting the one or more exception handling code segments into the test code block in response to identifying the one or more exception handling code segments. In addition, the test code block is stored.

BRIEF DESCRIPTION OF THE SEVERAL VIEWS OF THE DRAWINGS

Referring now to the drawings wherein like elements are numbered alike in the several FIGURES.

DETAILED DESCRIPTION

An exemplary embodiment of the present invention provides for relocatable interrupt handlers in a test execution suite.

The testing of exceptions and interrupts is an important part of processor verification. Therefore, a test generator generally has an interrupt handler procedure. Testing of system architecture is usually performed by tests that are created by a test generator. A test generator may allocate a single or several assembly routines to handle all the interrupts generated in a single test. Assembly routines from the same memory location are then re-executed each time the same type of interrupt is generated.

The typical interrupt handler bases its decision algorithm on assembly routines by implementing a block of if-then-else statements. The more interrupt decisions the handler has to do, the more if-then-else statements will be in the assembly routine. This may make the assembly routine very large, which may cause performance problems in both generation and simulation. Very large assembly routines may also impact test execution by delaying design recovery from an interrupt.

Some of the interrupt handler decisions are based on information stored in a register or in memory and describe the nature of the interrupt. There are cases when this information is undefined (masked). An assembly routine can't recognize these kinds of cases. In addition, some of the interrupt conditions require randomization of a return-from-interrupt address. Implementation of pseudo-random algorithms in assembly code can be a tedious procedure.

An exemplary embodiment of the relocatable interrupt handler described herein adopts a different approach for handling interrupts in test generation. Instead of re-executing the same interrupt handler routine each time an interrupt of the same type is generated, the relocatable interrupt handler changes the address of the entrance to the next interrupt procedure. In this way, the handling of each interrupt is tailored to a specific interrupt condition raised by an instruction.

Figure 1:
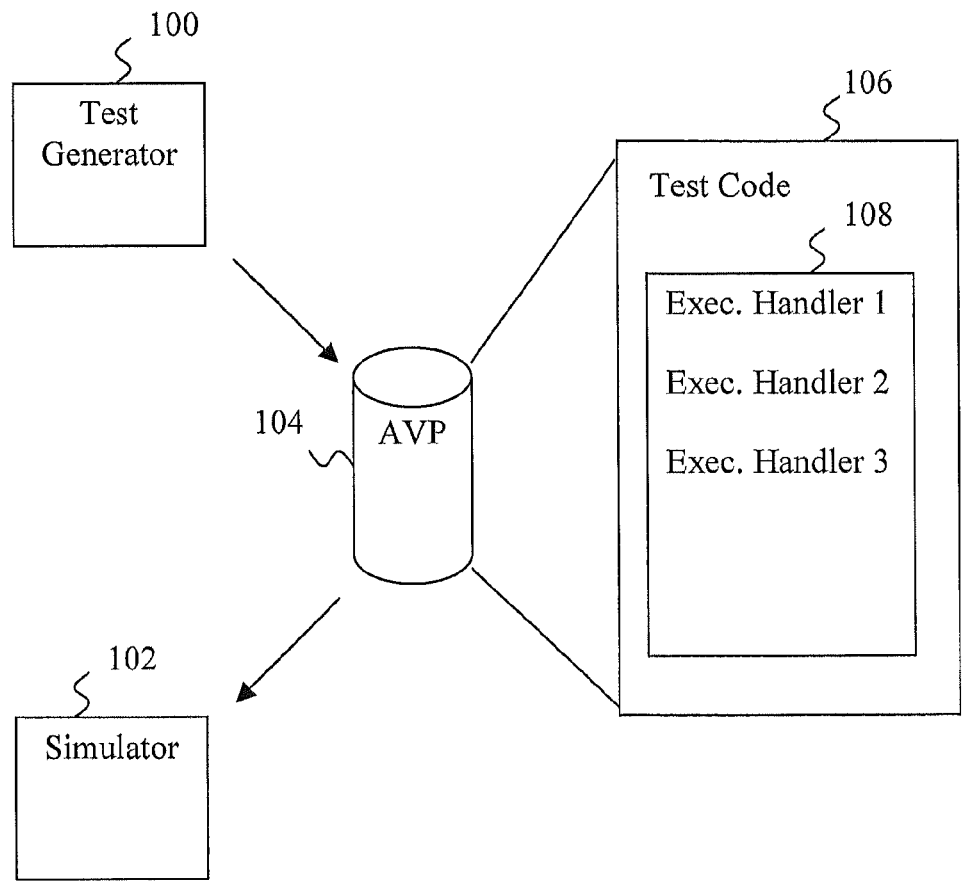
FIG. 1 depicts a block diagram of a relocatable interrupt handler test generation system that may be implemented by an exemplary embodiment.

Turning to FIG. 1, a system for implementing the generation and execution of relocatable interrupt handler code will now be described. In an exemplary embodiment a test generator 100 is executed to generate test code 106. The test generator encounters test instructions and searches an architectural verification program (AVP) database 104 for exception handling code 108 (also referred to herein as "exception handling logic") that is associated with the test instructions, as described more fully below. Once the test generator 100 completes generating the test code 106, a simulator 102 can execute the test code 106, as described in more detail below.

Figure 2:
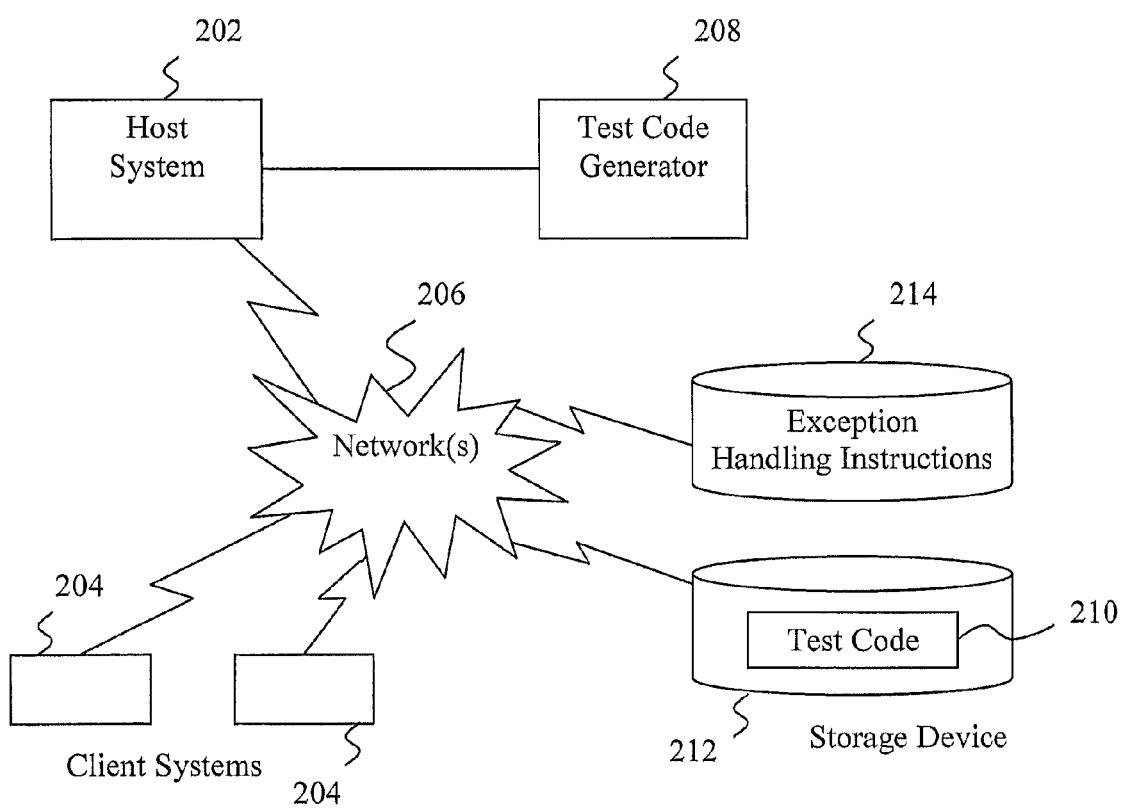
FIG. 2 depicts a block diagram of a data processing system that may be implemented by an exemplary embodiment.

Turning now to FIG. 2, an exemplary embodiment of a system 200 for implementing the generation of relocatable interrupt handler code will now be described. In an exemplary embodiment, the system 200 includes a host system 202 executing computer instructions for the generation of the relocatable interrupt handler, such as test generator 100 of FIG. 1. Host system 202 may operate in any type of environment that is capable of executing a software application. Host system 202 may comprise a high-speed computer processing device, such as a mainframe computer, to manage the volume of operations governed by an entity for which the generation of the relocatable interrupt handler is executing. In an exemplary embodiment, the host system 202 is part of an enterprise (e.g., a commercial business) that implements the generation of the relocatable interrupt handler.

The exemplary embodiment of the system 200 depicted in FIG. 2 also includes one or more client systems 204 through which users at one or more geographic locations may contact the host system 202. The client systems 204 are coupled to the host system 202 via one or more networks 206. Each client system 204 may be implemented using a general-purpose computer executing a computer program for carrying out the processes described herein. The client systems 204 may be personal computers (e.g., a lap top, a PDA mobile device) or host attached terminals. If the client systems 204 are personal computers, the processing described herein may be shared by a client system 204 and the host system 202 (e.g., by providing an applet to the client system 204). Client systems 204 may be operated by authorized users (e.g., programmers) of the generation of relocatable interrupt handler processes described herein.

The networks 206 may be any type of known networks including, but not limited to, a wide area network (WAN), a local area network (LAN), a global network (e.g., Internet), a virtual private network (VPN), and an intranet. The networks 206 may be implemented using a wireless network or any kind of physical network implementation known in the art. A client system 204 may be coupled to the host system 202 through multiple networks (e.g., intranet and Internet) so that not all client systems 204 are coupled to the host system 202 through the same network. One or more of the client systems 204 and the host system 202 may be connected to the networks 206 in a wireless fashion. In one embodiment, the networks include an intranet and one or more client systems 204 execute a user interface application (e.g., a web browser) to contact the host system 202 through the networks 206. In another exemplary embodiment, the client system 204 is connected directly (i.e., not through the networks 206) to the host system 202 and the host system 202 contains memory for storing data in support of the generation of relocatable interrupt handler. Alternatively, a separate storage device (e.g., storage devices 212 and 214) may be implemented for this purpose.

The test code storage device 212 includes a data repository with data relating to test code 106 that is generated by the system 200, as well as other data/information desired by the entity representing the host system 202 of FIG. 2. The exception handling instructions storage device 214 includes a data repository 104 with data relating to exception handling code 108, as well as other data/information desired by the entity representing the host system 202 of FIG. 2. The storage devices 212 and 214 are logically addressable as a consolidated data source across a distributed environment that includes networks 206. Information stored in the storage devices 212 and 214 may be retrieved and manipulated via the host system 202 and/or the client systems 204. The data repository includes one or more databases containing, e.g., generated test code 106, exception handling instructions 108 and corresponding configuration parameters, values, methods, and properties, as well as other related information. The test generation process is described further in FIG. 4. It will be understood by those of ordinary skill in the art that the data repository may also comprise other structures, such as an extensible markup language (XML) file on the file system or distributed over a network (e.g., one of networks 206), or from a data stream from another server located on a network. In addition, the storage devices 212 and 214 may alternatively be located on a client system 204. Although storage devices 212 and 214 are described as separate storage devices, it will be understood that the system could also include a single storage device in an alternate embodiment.

The host system 202 depicted in the system of FIG. 2 may be implemented using one or more servers operating in response to a computer program stored in a storage medium accessible by the server. The host system 202 may operate as a network server (e.g., a web server) to communicate with the client systems 204. The host system 202 handles sending and receiving information to and from the client systems 204 and can perform associated tasks. The host system 202 may also include a firewall to prevent unauthorized access to the host system 202 and enforce any limitations on authorized access. For instance, an administrator may have access to the entire system and have authority to modify portions of the system. A firewall may be implemented using conventional hardware and/or software as is known in the art.

The host system 202 may also operate as an application server. The host system 202 executes one or more computer programs to provide the generation of relocatable interrupt handler code. Host system 202 includes a test code generator 208 that executes on one or more processors (not shown). The test code generator 208 generates the test code 210. Upon generation of the test code 210, the test code 210 is stored on the storage device 212. Host system 202 may also be used to execute the completed test code 210 on, for example, a test simulator 102, or other suitable application.

As indicated above, processing may be shared by the client systems 204 and the host system 202 by providing an application (e.g., a java applet) to the client systems 204. Alternatively, the client system 204 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

It will be understood that the generation of the relocatable interrupt handler code described in FIG. 2 may be implemented in hardware, software, or a combination thereof.

Figure 3:
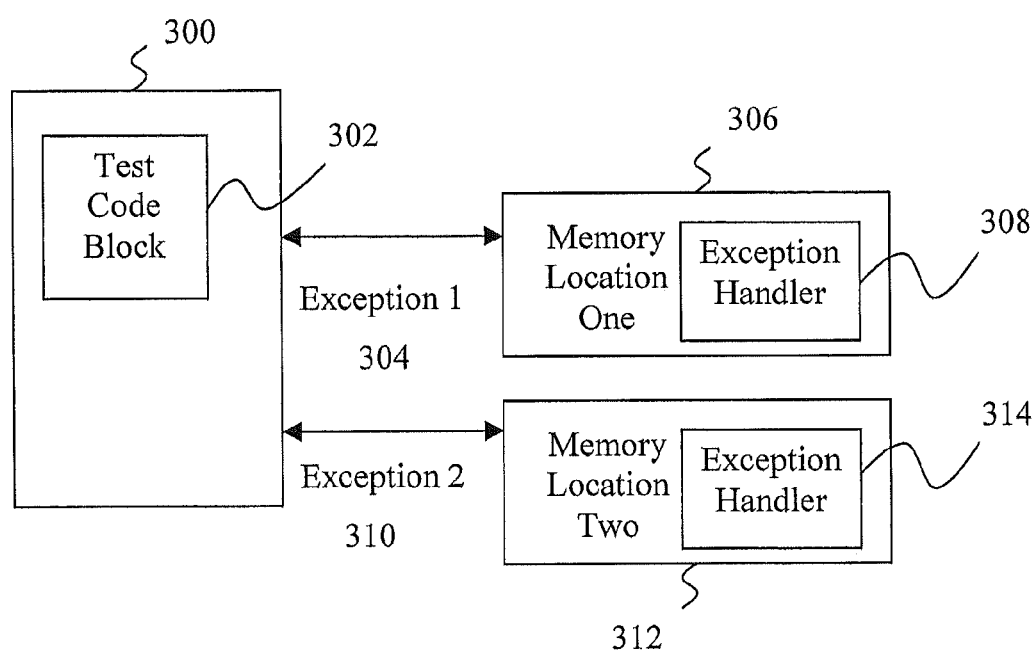
FIG. 3 depicts a block diagram of a processor and memory circuits that may be implemented by an exemplary embodiment.

FIG. 3 is a block diagram of an example computer system 300 and memory circuits 306 and 312 that may be implemented by an exemplary embodiment. The computer system 300 executes a test code block 302 (containing all or a portion of the test code 210). In an exemplary embodiment, the test code block 302 generates exception one 304. The exception handler 308 (containing exception handling logic associated with exception one 304) begins execution at memory location one 306 and catches exception one 304. The exception handler 308 handles the exception, as will be described further below, and returns execution to test code block 302. The test code block 302 then continues execution where it left off prior to the exception. The test code block 302 executes until another exception, exception two 310, is triggered. The exception handler 314 begins execution at a different memory location, memory location two 312 and catches the exception two 310. The exception handler 314 handles the exception, as will be described further below, and returns execution to the test code block 302. The test code block 302 then continues execution where it left off prior to the exception. The test code block 302 continues execution as described above until all tests have executed.

As depicted in the exemplary embodiment depicted in FIG. 3, all exception conditions are handled in their own memory locations separate from the memory location used by the test code block 302 or any other programs executed as part of the test code execution. Although only two memory locations were used in the exemplary embodiment described above, it will be understood that the current invention can handle a plurality of exceptions in a plurality of memory locations.

Figure 4:
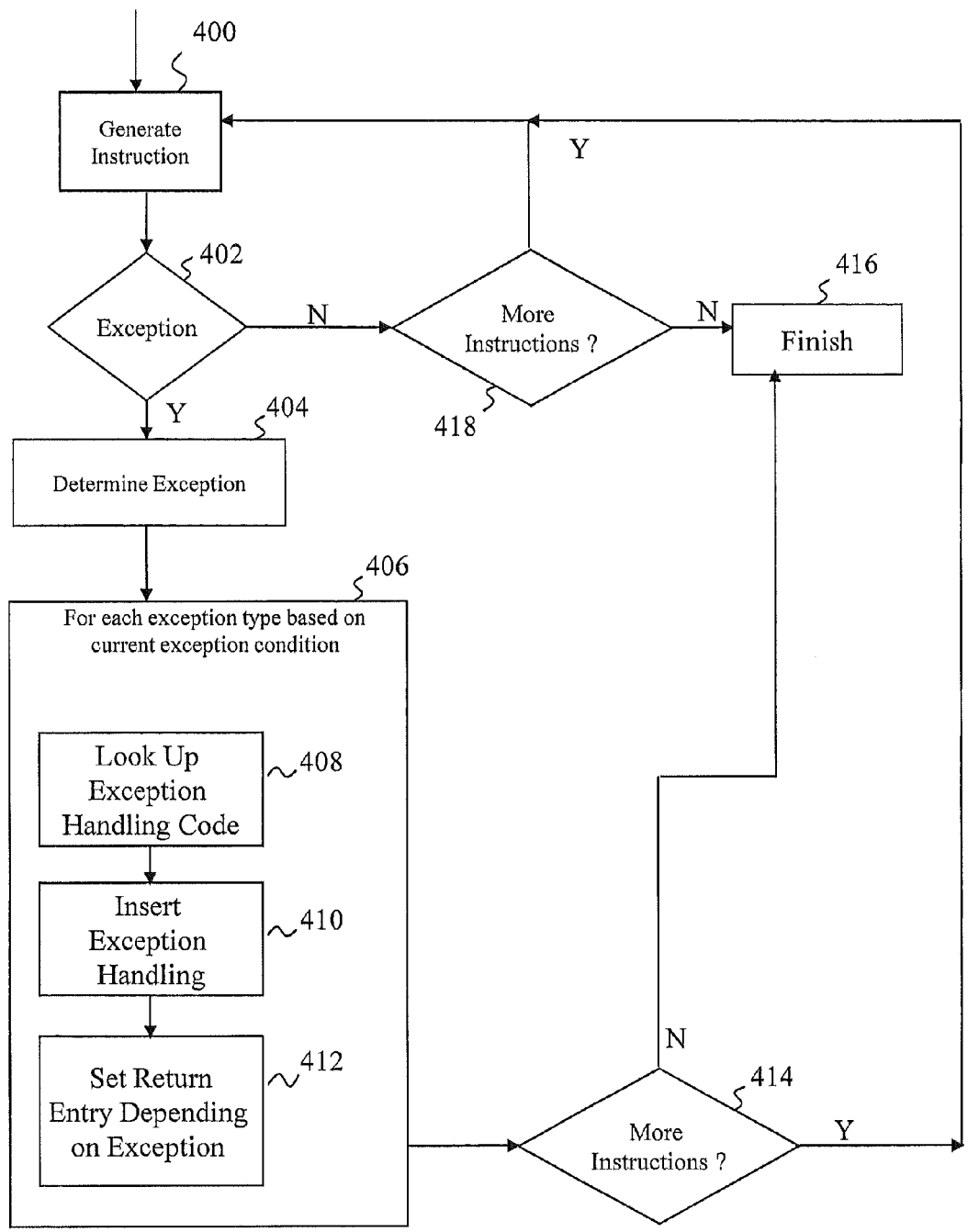
FIG. 4 depicts a process flow that may be implemented by an exemplary embodiment for generating test code blocks for executing tests including relocatable interrupt handler code.

FIG. 4 depicts a process flow that may be implemented by exemplary embodiments for generating test code blocks for executing tests including relocatable interrupt handler code executed on host system 202. At block 400, the test code generator 208 generates a test code instruction and inserts it into the test code 210. To facilitate explanation, the exemplary embodiment will be discussed in conjunction with assembly language coding but it will be understood that the test code block can also be generated using other methods and languages such as, but not limited to, C, C++ and Java. At block 402, the test code generator 208 checks to see if the instruction generated at block 400 is associated with one or more exception conditions. This can be accomplished by checking storage device 214, for example, in a database that contains a lookup table with instructions and associated exceptions. At block 402, if at least one exception condition is associated with the instruction generated at block 400, then the process continues to block 404. At block 404, the test code generator 208 determines the exception type for each of the exceptions associated with the instruction generated at block 400. At block 406, the test code generator, for each exception type determined at block 404 executes blocks 408-412. At block 408, the test code generator looks up an exception handling code segment (also referred to herein as "exception handling logic") that will be used to handle the specific exception type. The test code generator 208 may look up the exception handling code segment in, for example, a database located on storage device 214. The storage device 214 may, for example, contain a database with a lookup table storing the exception conditions and their associated exception handling instructions. Although the processing is described here serially, it will be understood that an exemplary embodiment of the current invention could operate in parallel such that multiple exception handling codes can be looked up at the same time, up to and including looking up all of the exception handling code segments at the same time.

Turning now to block 410, the exception handling code segment is inserted in the test code 210. This can be accomplished, for example, by adding the exception handling instructions inline, to the correct location in the test code 210 that is currently being created, or alternatively, the test code 210 can be inserted into a code library, which is incorporated into the test code 210 when the test code is executed. At block 412, the test code generator 208 sets the return point of execution within the test code 210 depending on the exception handling code segment as discussed further below. At block 414, the test code generator 208 checks to see if there are more instructions to generate for the current test code 210. If there are no more instructions to generate, the test code generator moves to block 416 and takes whatever blocks are necessary to finalize the test code 210 as discussed above. Returning to block 414, if the test code generator 208 determines that there are more instructions to generate, execution returns to block 400 and the process continues as described above.

Returning now to block 402, if there are no exception conditions associated with the instruction, the test code generator 208, at block 418, checks to see if there are more instructions to generate for the current test code 210. If there are no more instructions to generate, the test code generator 208 moves to block 416 and takes whatever blocks are necessary to finalize the test code 210. This could include, for example, writing the test code 210 to storage device 212, or another similar storage device. In one exemplary embodiment a report is generated at block 416 that summarizes, for example, the tests that will be executed within the test code, the number of instructions to be executed, and the size of the test code 210 in bytes. Returning again to block 418, if the test code generator 208 determines that there are more instructions to generate, execution returns to block 400 and the process continues as described above.

Figure 5:
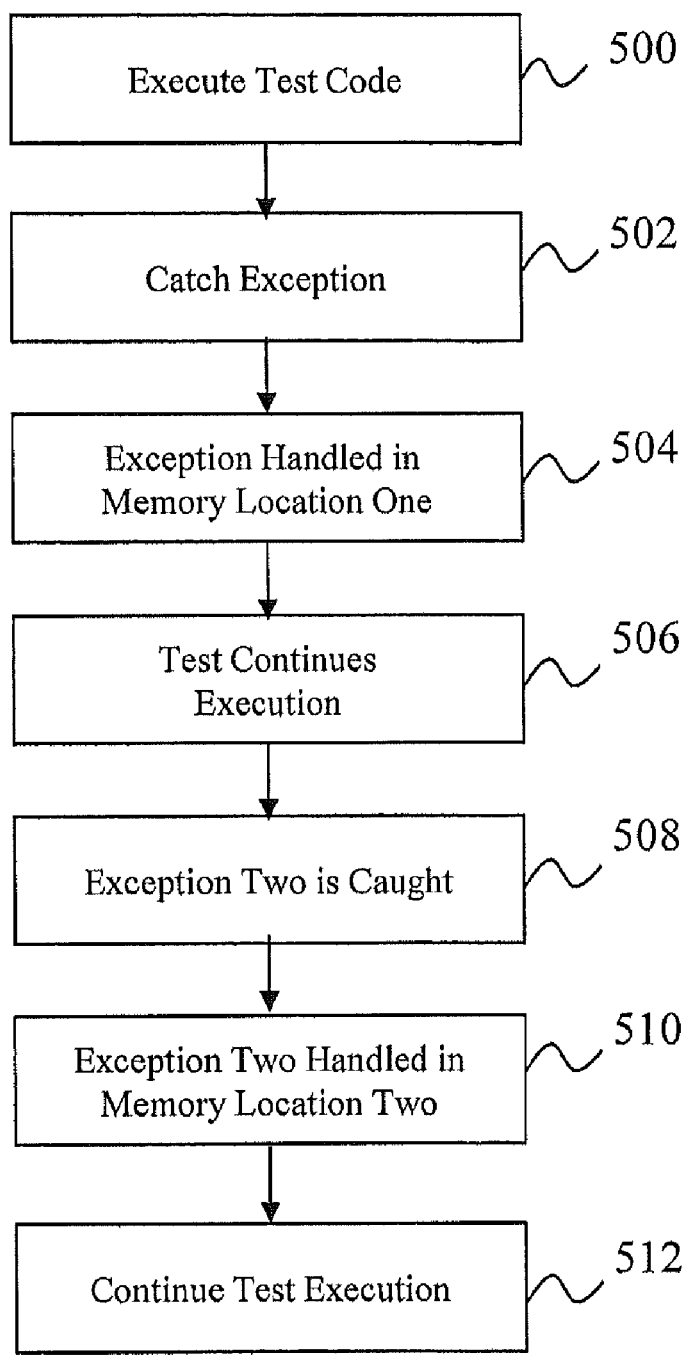
FIG. 5 depicts a process flow that may be implemented by an exemplary embodiment for executing a test incorporating a relocatable interrupt handler.

FIG. 5 depicts a process flow of a test execution algorithm that may be implemented by an exemplary embodiment. In an exemplary embodiment, the algorithm is executed by the computer system 300 which is responsible for executing test code block 302. At block 500, a test code block 302 is executed on computer system 300 in a memory location (not shown). In an exemplary embodiment, the test code block 302 executes a series of tests for testing a computer processor circuit (not shown). In this embodiment, the test code block 302 executes code (e.g., a test instruction) that may generate an exception. At block 502, the test code executed at block 500 generates an exception, which is caught by an exception handler (also referred to herein as "exception handling logic" or an "exception handling code segment"). As shown at block 504, the exception handler, which, in an exemplary embodiment, is embedded in test code block 302, begins execution at memory location one 306. As described above, memory location one 306 is a separate memory location from the memory location used by the test code block 302.

In one exemplary implementation, the exception handler in block 504 may correct the exception with a program event recording (PER) event. In the z/Architecture®, for example, PER events occur when certain things happen during an instruction's execution. Some examples of PER events are when an instruction is fetched from a range of addresses, a store occurs to a range of addresses, or a branch occurs. In the z/Architecture®, these events cause the PER event to be presented and an interrupt handler to be invoked. To correct this condition, PER must be disabled in the program status word (PSW) or the appropriate bit turned off in, for example, control register 9. The IBM® z/Achitecture® is described more fully in the IBM® publication: "z/Architecture® Principles of Operation"; IBM® publication SA22-7832-06, which is hereby incorporated by reference in its entirety.

In another exemplary embodiment, the exception handler at block 504 corrects the cause of the exception by correcting any error conditions directly in memory. In an exemplary embodiment, an access exception is triggered while fetching data at address 0x0004FDF6. The exception is a page translation exception and the exception handler built into the test code itself is executed. As the exception handler executes, it executes a load (e.g., LGF) instruction that gets addressability to a data block followed by an add character (NC) assembly instruction. The exception handling code segment for this particular exception turns off the invalid bit in a dynamic address translation (DAT) table entry. Once the error condition has been cleared, the exception handler returns execution to the test code with a load program status word extended (LPSWE) assembly instruction. Now test execution can continue because the page translation exception has been removed. In another exemplary embodiment, the exception is ignored and no corrective action is required. In yet another exemplary embodiment, an error is logged by the exception handler to indicate what exception was caught and any corrective actions taken by the exception handler.

At block 506, execution of test code block 302 continues after the exception is handled and the exception condition is cleared. At block 508, another exception is triggered and caught by a second exception handler. At block 510, the exception is handled as described above in a second memory location 312. As described above, the second memory location 312 is a separate memory location from the memory location used by the test code block 302. At block 512 execution of test code block 302 continues in this manner until the test is completed. In an exemplary embodiment, once the execution of the test code block has completed, a return code that indicates a result of the execution (e.g., successful, not successful, number of errors, number of test instructions executed, etc.) is generated. The return code may be returned to a requestor of the execution of the test code block 302 or it may be stored in a location that is accessible by the requestor (or other users/systems).

Technical effects and benefits include tailoring test code interrupt logic so that it is specific to the interrupt condition that is raised by the test code instructions, which may result in smaller test code and more efficient test execution. In addition, the generated test code contains exception handling code segments that execute in separate areas of memory. Various types of exceptions require different types of corrections. Access exceptions, for example, require modifying translation tables in storage (for example, by turning off invalid bits in an entry). As discussed above, PER Events require the exception handling code to turn off a bit in Control Register 9 or the PSW. Further benefits, therefore, include generated test code with exception handling code segments that correct, directly in memory, the various types of error conditions that created an exception, and then returning execution to the test code for completion of the test.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
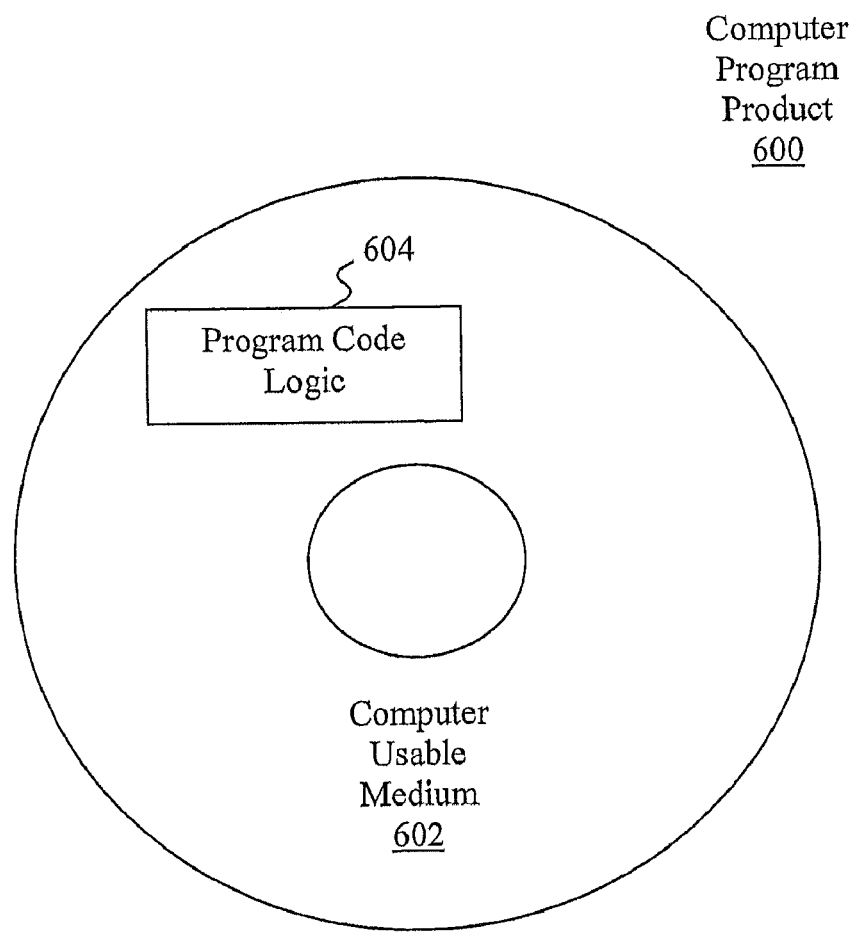
FIG. 6 depicts a computer program product that may be implemented by an exemplary embodiment of the invention.

As described above, embodiments can be embodied in the form of computer-implemented processes and apparatuses for practicing those processes. In exemplary embodiments, the invention is embodied in computer program code executed by one or more network elements. Embodiments include a computer program product 600 as depicted in FIG. 6 on a computer usable medium 602 with computer program code logic 604 containing instructions embodied in tangible media as an article of manufacture. Exemplary articles of manufacture for computer usable medium 602 may include floppy diskettes, CD-ROMs, hard drives, universal serial bus (USB) flash drives, or any other computer-readable storage medium, wherein, when the computer program code logic 604 is loaded into and executed by a computer, the computer becomes an apparatus for practicing the invention. Embodiments include computer program code logic 604, for example, whether stored in a storage medium, loaded into and/or executed by a computer, or transmitted over some transmission medium, such as over electrical wiring or cabling, through fiber optics, or via electromagnetic radiation, wherein, when the computer program code logic 604 is loaded into and executed by a computer, the computer becomes an apparatus for practicing the invention. When implemented on a general-purpose microprocessor, the computer program code logic 604 segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A computer program product for executing test code with relocatable interrupt handler instructions, the computer program product comprising:
   a non-transitory machine-readable storage medium readable by a processing circuit and storing instructions for execution by the processing circuit for performing a method comprising:
   executing, by a computer, a test code block comprising a plurality of test instructions, the executing comprising for one or more of the test instructions:
   executing the test instruction;
   determining that the executing the test instruction caused an exception condition to occur;
   based on the determining, locating exception handling logic at an entry address;
   executing first exception handling logic associated with the exception condition based on determining that the executing the test instruction caused the exception condition to occur, the first exception handling logic located at the entry address consisting of a first memory address value, the executing the first exception handling logic comprising:
   clearing the exception condition; and changing the entry address, by the first exception handling logic, to a second memory address value, the second memory address value being an address of a second exception handling logic for handling another exception condition of the test code block; and returning execution from the first exception handling logic to the test instruction that caused the exception condition to occur;

continuing execution of the test code block; and generating a return code indicating a result of the executing the test code block.

2. The computer program product of claim 1, wherein repeated execution of the test code block causes a plurality of exception conditions to occur.

3. The computer program product of claim 2, wherein different exception handling logic is executed at different memory locations for each of the plurality of exception conditions.

4. The computer program product of claim 1, wherein repeated execution of the test instruction causes a plurality of exception conditions to occur.

5. The computer program product of claim 1, wherein the method further comprises:

executing another test instruction of the test code block after returning from the first exception handling logic;

determining that the executing the another test instruction caused the another exception condition to occur, wherein the exception condition and the another exception condition are different conditions of a same type of exception; and executing the second exception handling logic associated with the another exception condition based on determining that the executing the another test instruction caused the another exception condition to occur, the second exception handling logic located at the entry address consisting of the second memory address value.

6. The computer program product of claim 1, wherein the clearing the exception condition comprises at least one of utilizing a program event recording (PER) and setting data bits in memory.

7. The computer program product of claim 1, wherein the clearing the exception condition comprises ignoring the exception condition.

8. The computer program product of claim 1, wherein the exception condition is logged.

9. A computer implemented method for executing test code with relocatable interrupt handler instructions, the method comprising:

executing, by a computer, a test code block comprising a plurality of test instructions, the executing comprising for one or more of the test instructions:

executing the test instruction;

determining that the executing the test instruction caused an exception condition to occur;

based on the determining, locating exception handling logic at an entry address;

executing first exception handling logic associated with the exception condition based on determining that the executing the test instruction caused the exception condition to occur, the first exception handling logic located at the entry address consisting of a first memory address value, the executing the first exception handling logic comprising:

clearing the exception condition; and changing the entry address, by the first exception handling logic, to a second memory address value, the second memory address value being an address of a second exception handling logic for handling another exception condition of the test code block; and returning execution from the first exception handling logic to the test instruction that caused the exception condition to occur;

continuing execution of the test code block; and generating, by the computer, a return code indicating a result of the executing the test code block.

10. The method of claim 9, wherein repeated execution of the test code block causes a plurality of exception conditions to occur.

11. The method of claim 10, wherein different exception handling logic is executed at different memory location for each of the plurality of exception conditions.

12. The method of claim 9, wherein repeated execution of the test instruction causes a plurality of exception conditions to occur.

13. The method of claim 9, wherein the method further comprises:

executing another test instruction of the test code block after returning from the first exception handling logic;

determining that the executing the another test instruction caused the another exception condition to occur, wherein the exception condition and another exception condition are different conditions of a same type of exception; and executing the second exception handling logic associated with the another exception condition based on determining that the executing the another test instruction caused the another exception condition to occur, the second exception handling logic located at the entry address consisting of the second memory address value.

14. The method of claim 9, wherein the clearing the exception condition comprises at least one of utilizing a program event recording (PER), setting data bits in memory, and ignoring the exception condition.

15. The method of claim 9, wherein the exception condition is logged.

16. A computer system for executing test code with relocatable handler instructions, the system comprising:

a processor, the system configured to perform a method comprising:

executing a test code block comprising a plurality of test instructions, the executing comprising for one or more of the test instructions:

executing the test instruction;

determining that the executing the test instruction caused an exception condition to occur;

based on the determining, locating exception handling logic at an entry address;

executing first exception handling logic associated with the exception condition based on determining that the executing the test instruction caused the exception condition to occur, the first exception handling logic located at the entry address consisting of a first memory address value, the executing the first exception handling logic comprising:

clearing the exception condition; and changing, by the first exception handling logic, the entry address to a second memory address value, the second memory address value being an address of a second exception handling logic for handling another exception condition of the test code block; and returning execution from the first exception handling logic to the test instruction that caused the exception condition to occur;

continuing execution of the test code block; and generating a return code indicating a result of the executing the test code block.

17. The system of claim 16, wherein repeated execution of the test code block causes a plurality of exception conditions to occur.

18. The system of claim 17, wherein different exception handling logic is executed at different memory locations for each of the plurality of exception conditions.

19. The system of claim 16, wherein repeated execution of the test instruction causes a plurality of exception conditions to occur.

20. The system of claim 16, wherein the method further comprises:

executing another test instruction of the test code block after returning from the first exception handling logic;

determining that the executing the another test instruction caused the another exception condition to occur, wherein the exception condition and the another exception condition are different conditions of a same type of exception; and executing the second exception handling logic associated with the another exception condition based on determining that the executing the another test instruction caused the another exception condition to occur, the second exception handling logic located at the entry address consisting of the second memory address value.

21. The system of claim 16, wherein the clearing the exception condition comprises at least one of utilizing a program event recording (PER) and setting data bits in memory.

22. The system of claim 16, wherein the clearing the exception condition comprises ignoring the exception condition.

23. The system of claim 16, wherein the exception condition is logged.

* * * * *